W. A. FOSS.
ARTIFICIAL BAIT.
APPLICATION FILED APR. 22, 1916.
1,264,627.
Patented Apr. 30, 1918.
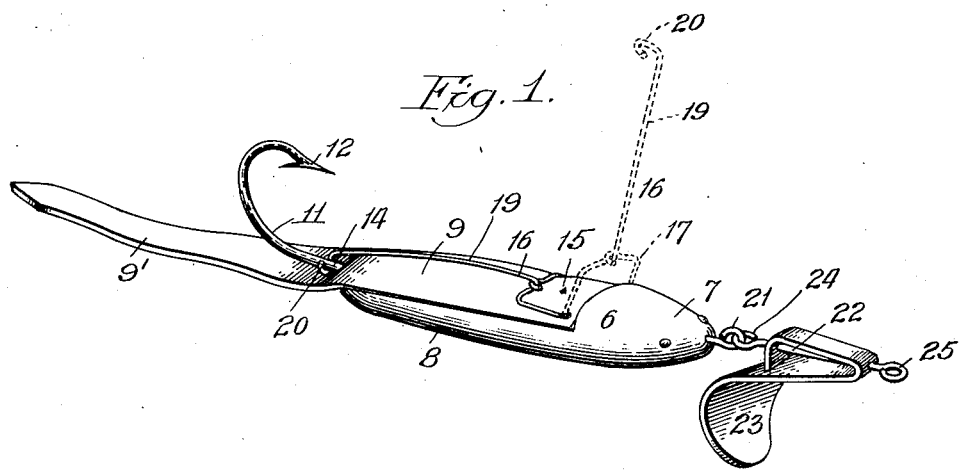
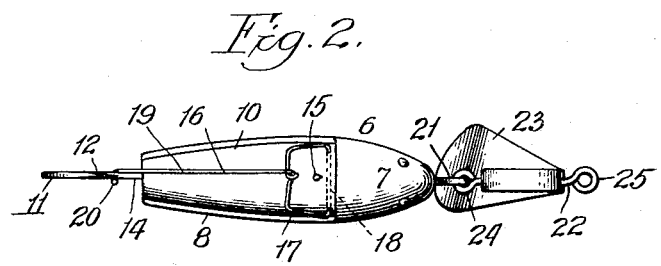
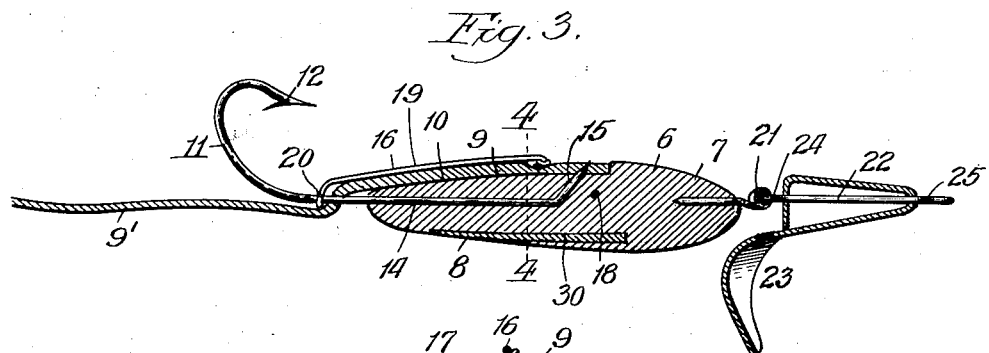
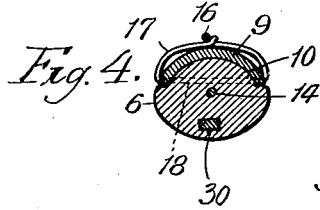
Witness:
John Enders
Inventor:
William A. Foss
by Fred G. Dieterich
his Atty.

UNITED STATES PATENT OFFICE.

WILLIAM A. FOSS, OF CLEVELAND, OHIO.

ARTIFICIAL BAIT.

1,264,627.  Specification of Letters Patent.  Patented Apr. 30, 1918.

Application filed April 22, 1916. Serial No. 92,839.

*To all whom it may concern:*

Be it known that I, WILLIAM A. Foss, a citizen of the United States, and a resident of Cleveland, in the county of Cuyahoga and State of Ohio, have invented certain new and useful Improvements in Artificial Bait, of which the following is a full, clear, and exact description.

The invention relates to artificial bait for fishing, and more particularly to the kind used in casting or trolling.

In practice, it has been found that a rigid body, such as a wooden or celluloid minnow, in traveling through the water can be made to resemble in appearance a live bait and be more attractive to the fish, if there is associated therewith a freely flexible and wiggling tail-strip of pork rind or other suitable material, and that this wiggling will be accentuated by a spinner in front of the minnow.

The object of the invention is to provide an improved artificial bait resembling somewhat in appearance the head and body of a minnow and a flexible tail-strip or pork rind or the like, which, as the bait travels through the water, will wiggle to make the action of the bait life-like and attractive when drawn through the water.

The invention consists in the several novel features hereinafter set forth and more particularly defined by claims at the conclusion hereof.

In the drawings: Figure 1 is a perspective of a device embodying the invention. Fig. 2 is a plan, the flexible strip being removed. Fig. 3 is a longitudinal section. Fig. 4 is a section taken on line 4—4 of Fig. 3.

The improved bait comprises a substantially rigid member 6 generally resembling a minnow in form, and preferably formed of wood, celluloid or other suitable material. This member 6 has its front portion 7 formed to resemble the head and its rear portion 8 formed to resemble the body or belly of a minnow. A flexible strip 9 usually of pork rind fits across the upper portion of the body-portion 8 of member 6, the latter being cut away or recessed, as at 10, to receive the front portion of the strip 9. By placing the pork-rind in this recess, its front edge will be protected so it will not retard passage through the water. A fish-hook 11 comprises a prong 12, a shank 14 extending longitudinally and secured in the body 8 and an upwardly and forwardly inclined point 15 adapted to pass through the strip 9 near its front end to aid in securing the strip on the minnow. The hook proper is disposed rearwardly and above the minnow.

The flexible strip 9 extends horizontally from the minnow body and is impaled on the hook, as shown in Figs. 1 and 3, and is removably held thereon by a clamping-member 16. This clamping member is preferably formed of a strip of wire having a loop 17 at its front end. The cross-member 18 of this loop extends through the body 8 to pivotally connect member 16 to the minnow body. This clamping member comprises a longitudinally extending member 19 provided at its rear with a hook 20 adapted to hook under the shank 14 of the fish-hook and over the tail portion of the strip 9 beneath the shank 14. The clamping member is formed of stiff spring wire so that when it is locked in position shown in Fig. 1, the front portion of the strip 9 will be snugly and securely held on and will form the back of the minnow.

The strip 9 is cut in suitable shape to extend transversely across and cover the back portion of the minnow and to extend rearwardly from the hook, as at 9', to form a tail which is not merely flexible, but is pliable and free to wiggle transversely and longitudinally, moving through the water, which has been found to be an important attribute in attracting fish.

An eye 21 disposed at the front end of the artificial minnow has its shank secured in the head-portion 7. A spindle 22 for a one-blade spinner 23 has an eye 24 at its rear which is pivotally connected to the eye 21 and an eye 25 at its front end for connection to the fishing line or to a swivel if desired. The eye 21 is secured in the front of the minnow in eccentric or off-center relation and the one-blade spinner causes the spindle 22 and eye 21 to vibrate slightly in response to the whirling of the spinner, and this action causes the minnow, to which a portion of the flexible strip 9 is rigidly secured, to undulate, twist or wiggle the free tail-portion 9' as the bait is being drawn through the water. The shank 14 of the fish-hook and the eye 21 are secured above the longitudinal axis of the minnow so that the latter will be ballasted or weighted to hold the fish hook with its prong uppermost at substantially all times, and if desired a weight 30 may be built into body 8.

In practice, it has been found that the device by reason of its peculiar action in being drawn through the water is very lifelike in appearance and effective in attracting fish.

The device set forth exemplifies an artificial minnow or body having a freely flexible tail, the front portion of which is rigidly attached to the minnow body, and forms the minnow back, the tail being caused to undulate or wiggle in the water. Also one in which a flexible strip forms, in effect, a horizontally disposed caudal fin to undulate or wiggle in the water. Also one in which the artificial minnow has a flexible and detachable back and tail. Also one in which a single fish hook is disposed rearwardly of the minnow body and in which the flexible strip forms the back and tail of the minnow. Also one in which the action of a one-blade spinner is utilized to accentuate the wiggling of the flexible tail.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a fishing device, the combination of a substantially rigid body having a holding surface on the exterior thereof, a fish hook secured to the body, a substantially flat freely flexible strip having its front end lapping said surface and extending rearwardly of the hook to form a wiggly tail-piece, means to secure the front portion of the strip substantially exposed and flatwise on said surface, and means to cause the tail-piece to wiggle.

2. In a fishing device, the combination of a substantially rigid body having a transversely and longitudinally extending holding surface on the exterior thereof, a fish hook secured to the body, a substantially flat horizontal freely flexible strip having its front end lapping said surface and extending rearwardly of the body to form a wiggly tail-piece, means to secure the front portion of the strip substantially exposed and against said surface, and means to cause the tail-piece to wiggle.

3. In a fishing device, the combination of a substantially rigid body having an external recess formed therein, a fish hook secured to the body, a substantially flat freely flexible strip having its front end lapping the body and disposed in the recess and extending rearwardly of the body to form a wiggly tail-piece, means to secure the front end of the strip in said recess, and means to cause the tail-piece to wiggle.

4. In a fishing device, the combination of a substantially rigid body in the form of a minnow having an external recess therein, a fish hook secured to the body, a substantially flat freely flexible strip having its front end lapping the body and fitting in the recess and extending rearwardly of the body to form a wiggly tail-piece, means to secure the front portion of the strip in the recess, and means to cause the tail-piece to wiggle.

5. In a fishing device, the combination of a substantially rigid body in the form of a minnow having a recess in its back, a fish hook secured to the body, a substantially flat freely flexible strip having its front end lapping the body and forming the back thereof and extending rearwardly of the body to form a wiggly tail-piece, means to secure the front end of the strip on the back of the body, and means to cause the tail-piece to wiggle.

6. In a fishing device, the combination of an artificial minnow comprising a body and head portions, a detachable freely flexible substantially flat strip extending over the body and forming its back and extending rearwardly thereof to form a wiggly tail-piece, a fish hook secured to the body, means to secure the front end of the strip on the body, and means to cause the tail-piece to wiggle.

7. In a fishing device, the combination of a substantially rigid body, a fish hook having a shank extending longitudinally and secured in said body, said shank having an angular front end extended to form an exposed point, a flexible strip held by said point and a clamping member for the flexible strip.

8. In a fishing device, the combination of an artificial minnow-body, a flexible strip extending across a portion of said body portion, a fish hook secured in the body, and a clamping member pivoted to said body and extending longitudinally of and on the outer face of the strip and provided with means to lock on the hook to hold the strip on the body, the strip being impaled on the hook rearwardly of the body.

9. In a fishing device, the combination of an artificial minnow, a flexible strip extending across a portion of said body, a fish hook secured in the body and a clamping member pivoted to said body, having a loop at its front end and a member extending longitudinally of and on the outer side of the strip and provided with means to lock on the hook to hold the strip on the body.

10. In a fishing device, the combination of an artificial minnow, comprising a head and body portions, a flexible strip extending across said body portion, a fish hook secured in the body and a clamping member pivoted to said body and extending longitudinally of the strip and provided with means to lock on the hook to hold the strip on the body.

WILLIAM A. FOSS.